United States Patent [19]
Stamer et al.

[11] Patent Number: 4,827,280
[45] Date of Patent: May 2, 1989

[54] FLOW RATE CONTROL SYSTEM

[75] Inventors: Michael E. Stamer, Lincolnwood; Henry F. George, Rolling Meadows, both of Ill.

[73] Assignee: A. B. Dick Company, Chicago, Ill.

[21] Appl. No.: 230,750

[22] Filed: Aug. 9, 1988

[51] Int. Cl.$^4$ .............................................. A01D 15/18
[52] U.S. Cl. ...................................... 346/1.1; 346/75
[58] Field of Search ................................... 346/1.1, 75

[56] References Cited

U.S. PATENT DOCUMENTS

| | | | |
|---|---|---|---|
| 4,527,170 | 7/1985 | Twasani et al. | 346/75 |
| 4,575,735 | 3/1986 | Weinberg | 346/1.1 |
| 4,714,931 | 12/1987 | Ersnine et al. | 346/75 |

*Primary Examiner*—E. A. Goldberg
*Assistant Examiner*—Gerald E. Preston
*Attorney, Agent, or Firm*—Niro, Scavone

[57] ABSTRACT

A flow rate control system is disclosed for measurement of ink flow through an ink jet system. The flow rate control system receives an error signal indicative of deviation of flow rate from a set value. The system includes proportional (P), integral (I) and derivative (D) control to generate a control signal based on the magnitude and sign of the error signal. The control signal is used to control the on-time of an ink make-up valve which adds make-up ink to the system as ink is needed to maintain satisfactory operation. In a preferred embodiment, the PID controller has noise reduction capability through the use of clippers and low pass filters. In addition, conditional summation may be employed to minimize "hunting" at low error signal levels.

10 Claims, 8 Drawing Sheets

FLOW RATE CONTROL SYSTEM

BACKGROUND OF THE INVENTION

This invention relates to ink jet printing systems in general and to systems for maintaining satisfactory operation thereof in particular. Ink jet systems are generally known in this art and involve the use of electrically conductive ink compositions which are subjected to vibratory energy to create drops. The drops are then selectively charged for deflection by electrostatic plates onto a substrate to be marked. See, for example, U.S. Pat. No. 4,555,712. Drops which are not directed at the substrate return to an ink reservoir for reuse. As the system operates, ink is lost through printing and evaporation. This, as well as the effects of temperature and other system variations, causes the ink flow rate to vary, sometimes considerably. To sustain printing operations over a long period it is necessary to monitor and control the ink flow rate. Typically, control systems monitor the change in flow rate over a period of operation and, responsive to detection of changes, alter the ink composition or add make-up ink thereby to keep the flow rate substantially constant. A typical action is to periodically operate a valve permitting the addition of make-up ink to the ink reservoir to compensate for the loss of solvent from the ink.

One prior art approach to maintaining ink flow rate substantially constant is disclosed in the '712 patent, assigned to the present assignee. That patent is hereby incorporated by reference. The present invention is an improvement upon the '712 patent and reference thereto is made for additional details concerning an ink jet system in which the present invention may be utilized.

The device described in the '712 patent uses a simple scheme for determining operation of the make-up ink valve. If the flow time measurement reading is greater than the set point time the valve is actuated for a fixed time duration. This occurs once each system cycle until the flow time is less than the set point time. In some instances, an average flow time over several cycles is compared to the set point.

This type of flow control in which make-up ink is added or not based upon a comparison with the set point flow time can be referred to as a "go/no go" control. Such a method inherently causes oscillation in the flow time characteristic curve. For high evaporation rate inks the amplitude of oscillation can reach an unacceptable two seconds peak-to-peak. The problem can be further exaggerated if the operator does not pick optimum setup parameters for the system.

Oscillations in flow time characteristics are due to at least two sources. First, the total volume of ink in the system causes mixing time constant and process delays to occur. Therefore, corrective action occurs over a period of time as make-up ink propagates through the system. This insures that an over correction will occur before the corrective action is detected by the flow rate controller. Once corrective action stops, it does not resume until an under corrected condition is detected.

A second cause of oscillation is that even a small error in flow time results in initiation of a full ink addition cycle. Thus, the system acts like a high gain control system which is prone to oscillation.

It is desired to provide an improved method of controlling flow rate in an ink jet printer. Specifically, it is desired to provide a system in which the ink flow time may be maintained at a set value without significant deviation therefrom.

A further object of the invention is to provide a steady flow of make-up ink to compensate for evaporative losses without undesirable oscillations in the addition process.

A further object of the invention is to provide a system which can automatically accommodate a wide range of inks having different evaporative loss rates without the need for manual calibration by providing a self-adjustment capability which is not directly dependent upon operator skill.

Another object of the invention is to provide a system which can self-adjust as necessary and which can self-correct in the case of operator set-up error.

SUMMARY OF THE INVENTION

The present invention is a method and apparatus for controlling ink flow rate in an ink jet printer. The invention, which is an improvement over the system disclosed in the aforementioned '712 patent, utilizes the same basic flow time measurement process as disclosed therein but differs in its response to those measurements. The present invention utilizes the flow time measurement information as a feedback signal in a closed loop control system. The actual flow time is compared to a reference value or set point time. The difference between these two, designated the error signal, is used as an input to a control function which may be implemented with discrete electronic circuit components or by a programmed microcomputer. The control function determines the flow rate of make-up ink required to maintain the ink flow time, and therefore the ink flow rate, at a specified level. Preferably, the reference value will be the starting flow time of the system with fresh ink. Fresh ink may be used to determine the proper set point flow time as part of the normal machine set-up procedures. Since the control function of the present invention is designed to control flow time and hold it constant, it is permissable to utilize the starting flow time as the reference. Since flow rate is directly related to flow time the control function holds flow rate constant. The result of holding flow rate constant is to maintain substantially constant ink drop velocity which is desirable in a continuous stream ink jet printer.

The control function, according to the invention, is obtained by generating a valve on-time, T, according to the relationship:

$$T = K1(E) + K2\left(\frac{dE}{dt}\right) + K3 \qquad Edt$$

where:
E = Flow time − set point time
K1, K2, K3 are constants.

This relationship employs proportional, derivative and integral control factors to reduce oscillations to a minimum and achieve the desired objects of the invention.

DETAILED DESCRIPTION

Figure 1:
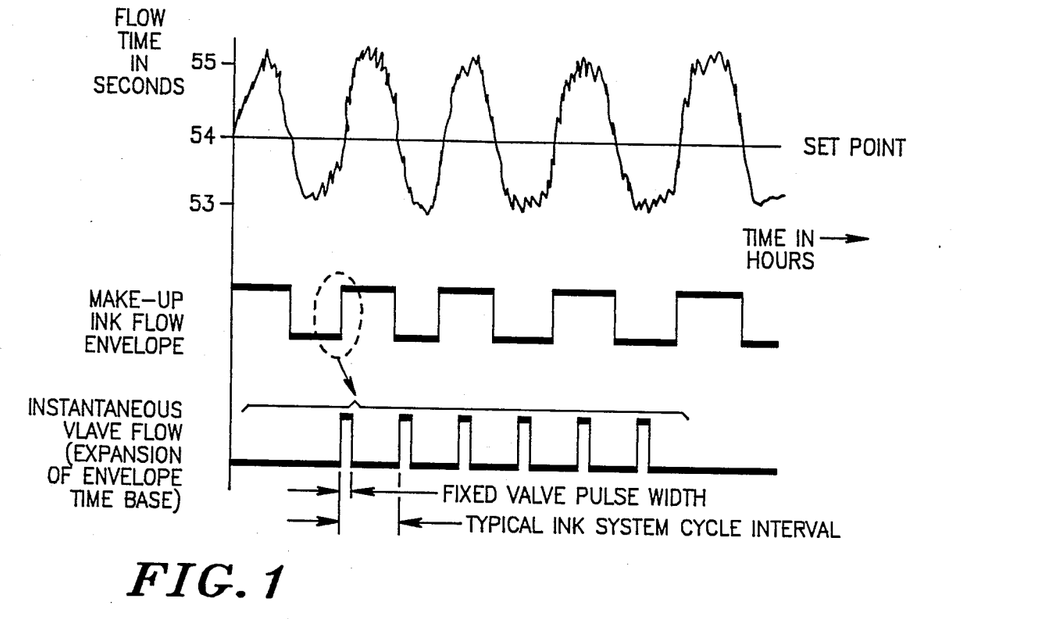
FIG. 1 is a diagram useful in explaining typical ink system operation and the problems associated therewith.

Referring to FIG. 1, there is shown a waveform which represents typical oscillatory behavior encountered in an ink jet system for which the present invention is suited. Note the set point, arbitrarily shown as 54 seconds, and that the actual flow time oscillates above and below the set point. The noise typical in a system of this type is represented by the irregular nature of the wave form. According to the prior art system disclosed in the '712 patent, whenever the flow time exceeds the set point, the make-up ink valve is operated for a fixed time interval to cause addition of make-up ink to the system. This method of operation contributes to the illustrated oscillation as explained in the background section of this specification.

Figure 2:
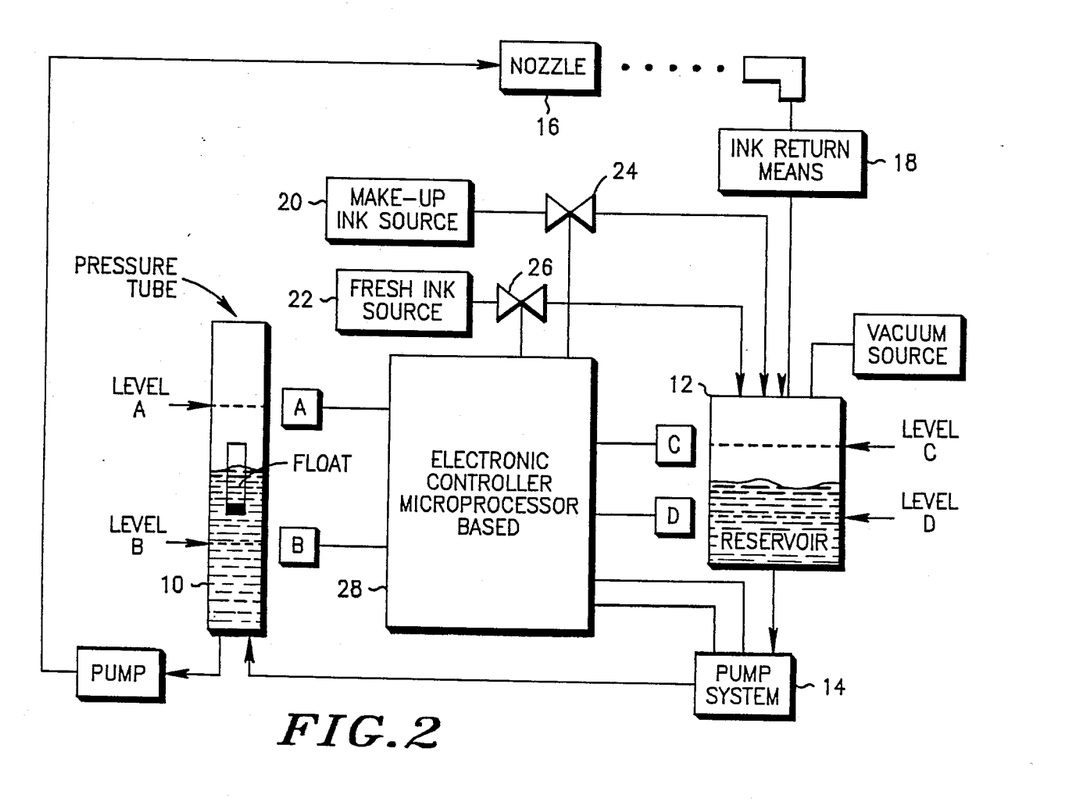
FIG. 2 is a simplified diagram of an ink jet system suitable for use with the present invention.

FIG. 2 is a simplified illustration of the ink jet system for which the present invention is intended. A more detailed version of this illustration is provided in the '712 patent. As shown in FIG. 2, a pressure tube 10 has float switches designated A and B which are activated by changes in the ink level within the tube. The tube is repetitively filled and emptied as ink passes from a reservoir 12, via a pump 14, to the pressure tube and ultimately the nozzle 16. Ink which is not applied to a substrate returns via an ink return system 18 to the reservoir. Make-up ink is contained in a reservoir 20 separate from fresh ink reservoir 22. Valves 24 and 26 control the addition of make-up ink and fresh ink to the reservoir 12. The make-up ink valve 24 is controlled by the electronic controller 28 which receives the flow rate data from the pressure tube 10 via the switches A and B. The controller may be a discrete logic controller which performs the functions described hereafter. However, according to a preferred embodiment of the invention, the functions will be implemented by a microcomputer system programmed to carry out the invention.

Figure 3:
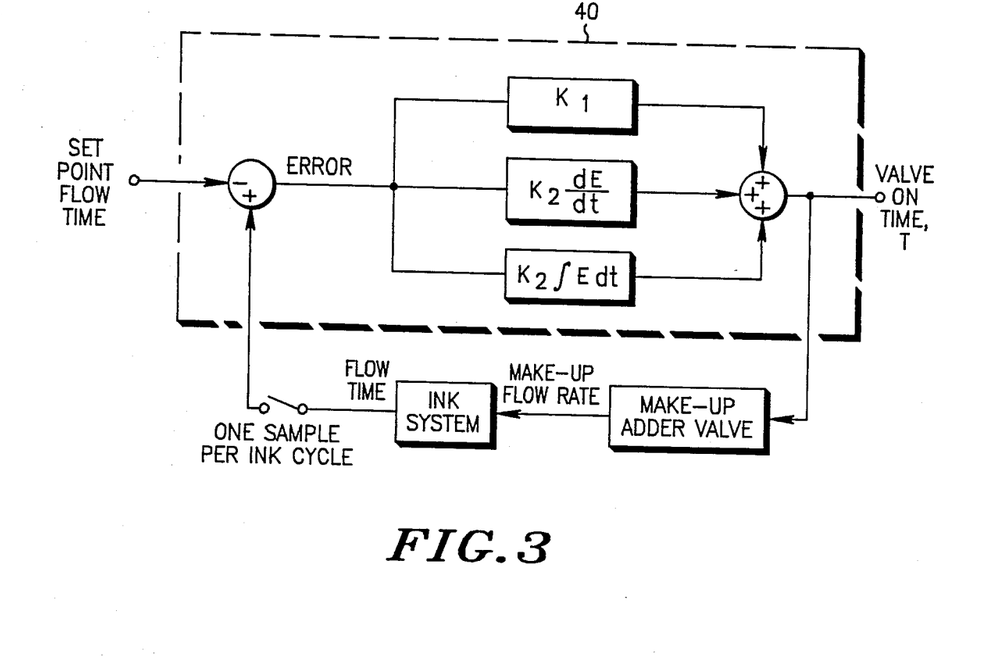
FIG. 3 is a block diagram illustrating the transfer function of the present invention.

Referring to FIG. 3, a simplified control block is provided. In this block, the upper portion contained within the dashed line 40 is the control function implemented in discrete logic or in software. The lower portion of the block represents the existing ink system. The input to the control function is the set point value, either manually entered by the operator or the flow time measured when the equipment is first turned on and a supply of fresh ink is provided to the system. The output of the control function is the valve on-time, T, which is used by the controller 28 to operate the valve 24.

The ink transfer function is a complex relationship which takes account of the mixing of several fluids, the total ink volume distributed through several chambers, flow mixing time constants, process delays and other phenomena associated with the system. The function cannot be expressed in precise mathematical terms. A rough approximation, however, is possible and allows the development of a satisfactory solution as illustrated in FIG. 3. Essentially, the solution assumes that the system is a volume of ink with gradual mixing and recirculating with a mixing time constant assumed to be on the order of about 15 minutes. Therefore, make-up ink added or any change in rate of flow of that ink only gradually changes the flow time measurement output.

The control function shown in FIG. 3 responds to a flow time reading taken once per cycle of the ink system. As disclosed in the referenced '712 patent, a typical ink cycle (the time period used to determine changes in the flow time) is on the order of 70–80 seconds, but will vary for different applications and different inks.

The control function produces a make-up adder valve turn on pulse once each cycle. The turn on pulse is of variable length depending upon the output of the transfer function. In this manner, a regular flow of make-up ink is established. In the basic system shown in FIG. 3, the valve on-time, T, is given by the relationship:

$$T = K1(E) + K2\left(\frac{dE}{dt}\right) + K3 \int E\,dt$$

where:
E = Flow time − set point
and K1, K2, K3 are constants.

The three terms each serve a specific purpose in controlling the dynamic response of the system. The three coefficients, K1, K2 and K3, are determined so as to provide a stable non-oscillatory system.

The proportional term causes an increase in valve ontime whenever there is positive increase in the error signal and vice versa. The derivative term counterbalances the first term by reducing the valve on-time in proportion to the rate of decrease of the error or conversely boosts the valve on-time in proportion to the rate of increase of the error.

The integral term causes the valve on-time to gradually increase until the error returns to zero. Without this third term, perfect balance could not be maintained because any control system has a finite upper limit to its forward gain or transfer function. Therefore, a non-zero output, such as the valve ontime, requires a non-zero input, i.e., the error signal, unless an integral term is provided. The result, theoretically, is that a steady state offset is provided proportional to the evaporation rate of the ink.

When the integral term is included, a step change in set point will cause the error temporarily to be non-zero. However, as long as the error remains positive, the valve time continues to increase with each successive cycle. If the system were to over compensate, the error becomes negative. The integration continues with a decreasing result until zero error is again achieved.

Figure 4:
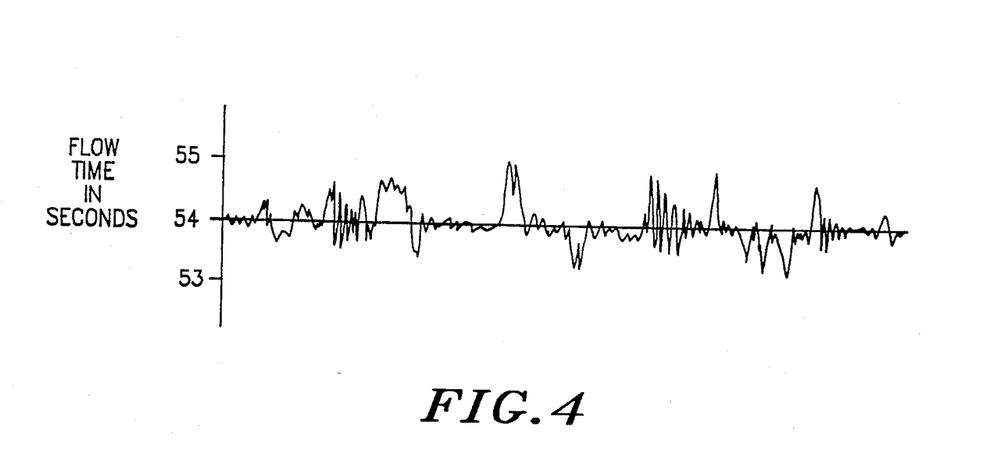
FIG. 4 is a waveform diagram illustrating the effects of noise on the operation of the system.
Figure 5:
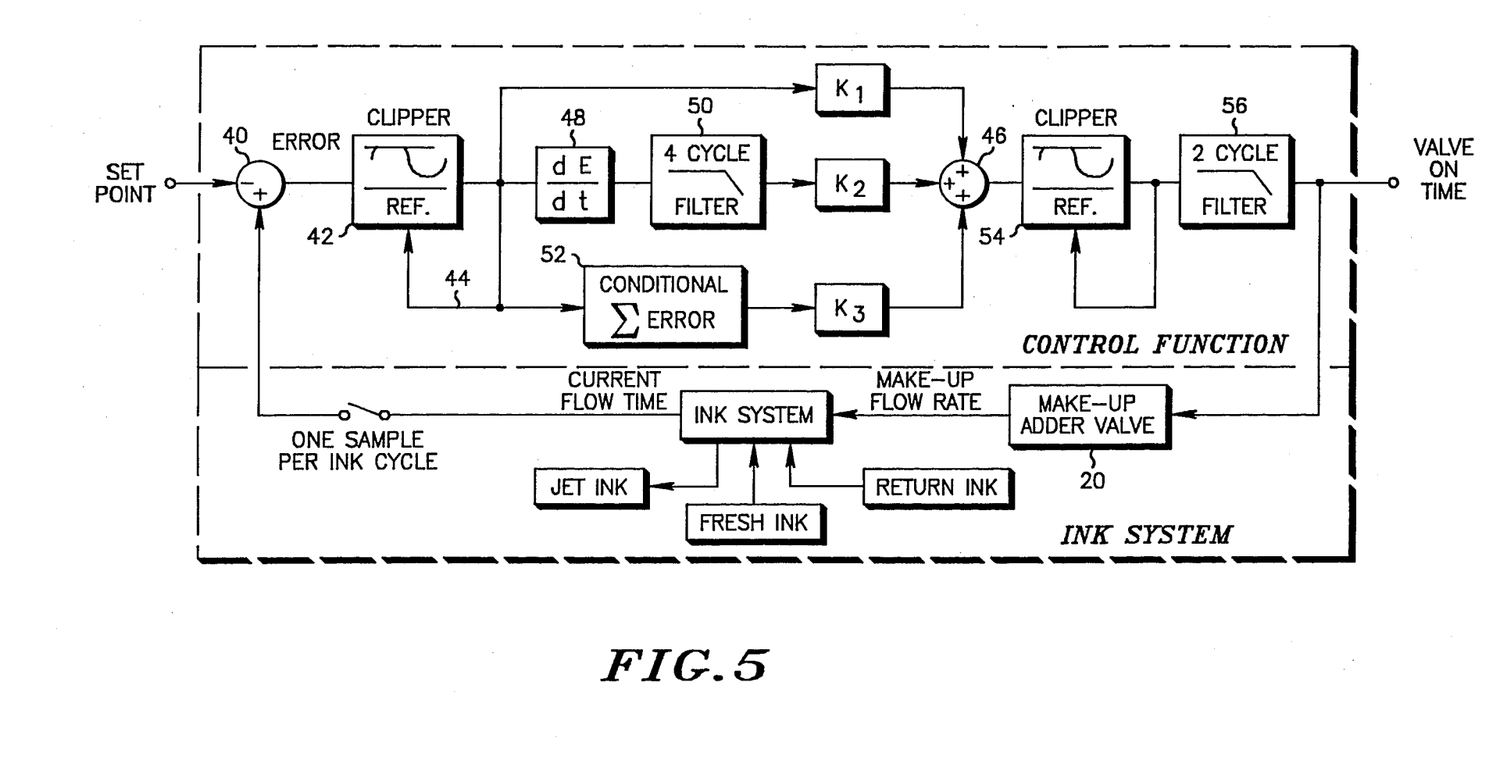
FIG. 5 is a block diagram similar to FIG. 3 modified to enhance the performance of the invention.

The system just described meets several of the stated objectives, but not all. In addition, it will suffer from the system response to noise. In implementing the control function, it is necessary to account for system noise. The noisy signal, such as shown in FIG. 4, creates serious problems when presented to a differentiator output. It is necessary therefore to provide a system which is somewhat more sophisticated and which can minimize or control the effects of noise. FIG. 5 illustrates a preferred embodiment of the control system of the present invention. It is generally the same as the embodiment illustrated in FIG. 3 but contains several additional functions which are intended to reduce the noise problems.

To deal with noise, but to keep added time lag from being excessive, two clipper stages (42 and 54) and two filter stages (50 and 56) are incorporated in the block diagram of FIG. 5. Their function will be explained hereafter. To deal with system variation over a wide range of ink types, the action of the integral term has been changed to perform error summing on a conditional basis.

The clipper circuits allow signals to pass without time lag or phase shift as long as the magnitude of the signal is within the clipping window. If the signal is either above or below the window, the output is limited to the window maximum or minimum. Once each cycle, by virtue of the feedback path shown, the reference for the clipper window is adjusted in the direction that the signal is moving. This action greatly reduces the noise level of the system.

The filters 50 and 56 are also intended to reduce noise. Notice that the first low pass filter (two cycle filter 50) treats only the differentiator output. It does not filter the other two signal paths. This is to minimize phase lag yet provide added filtering for the differentiating signal path where it is needed most. The second filter 56 adds further smoothing to the resultant valve on-time pulse train. The result of these modifications is an improved flow time wave form.

Referring more specifically to FIG. 5, the set point value (flow time) is provided as an input to the summing point 40, where a comparison is made against the actual flow time obtained from the magnetic switches A and B associated with the pressure tube 10 (FIG. 2). The result of the comparison is the error signal, which after clipping, is processed by the PID section of the controller. As indicated, the clipper 42 limits the error signal to a value within its current window. The window will shift up or down in the direction of the error by virtue of feedback path 44. The output of the clipper 42 is the input to all three sections of the PID control system. The proportional control simply scales the error signal by the value K1 and provides it to the summing point 46. The derivative section computes the derivative of the error signal at 48 and passes the resulting value through a two cycle filter 50 to reduce noise and then scales it by a constant K2. The summation function is conditionally performed, as indicated at 52, as explained hereafter.

The three components of the error signal are summed at summing point 46, subjected to a clipper circuit 54 and a filter 56. The resultant signal is the valve on-time signal which is used to control operation of the make-up ink adder valve 20. From the foregoing, it will be apparent, subject to the effects of the derivative and conditional summing terms, that the greater the error (positive), the greater the valve on-time and vice versa. Thus, unlike the fixed on-time capability of the prior art, the present invention modulates the make-up valve on-time as a function of the detected error signal. The result is far better control of ink flow time with the beneficial consequences described herein.

Conditional Summing

Figure 6:
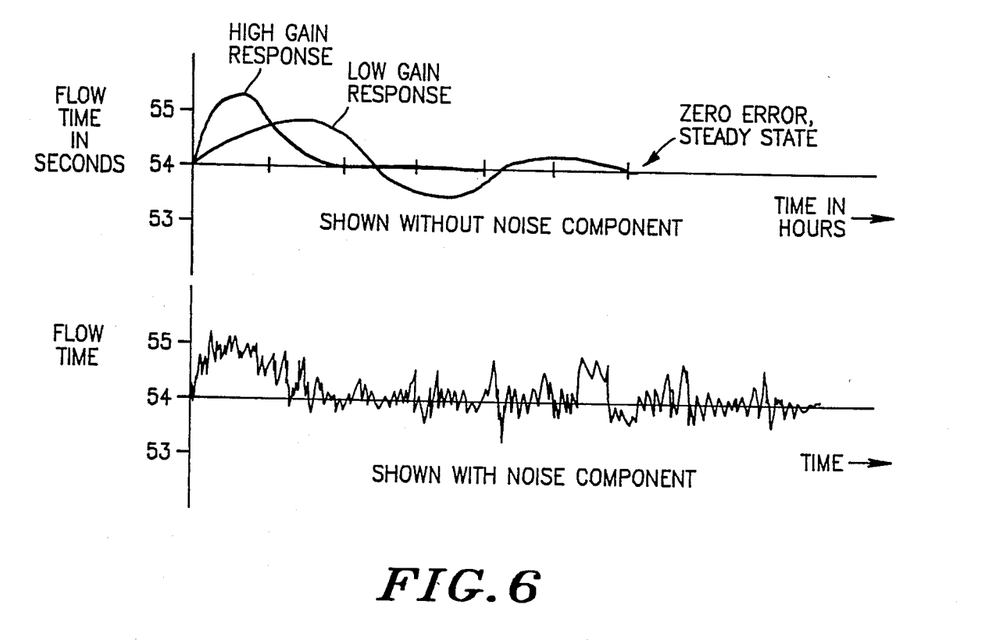
FIG. 6 illustrates the difference between high gain inks and low gain inks with respect to the operation of the present invention.

The overall gain of the forward transfer function, as well as the feedback transfer function, are both products of several factors. The variations of these factors result in a wide range of gain from machine to machine and from ink to ink. Such factors include:

Viscosity of fresh ink versus make-up ink
Evaporation rate of the ink
Specific gravity of fresh ink versus make-up ink
Viscosity of make-up ink
Reservoir vacuum level
Various restrictions to fluid flow in the make-up add system These gain variations affect the dynamic response of the system. The response to a step change best exemplifies the effect. Assume that the basic system, without conditional summing, is optimized with a choice of coefficients K1, 2 and 3 for a high gain ink. The transient response will show a temporary error which decays gradually to zero. However, a low gain ink in the same system will cause significant under shoot and possibly several cycles of hunting before a steady state zero error occurs (see FIG. 6). Conversely, if optimized for low gain, the high gain error peak grows larger.

The solution is to allow error summing to be turned off or on in a manner that is essentially self-adjusting. When the slope of the error curve is near zero, the flow rate of make-up ink is close to the actual evaporation rate. This is true even though the error may be at a peak. Therefore, according to the present invention summing for positive errors is stopped when the slope of the error (dE/dt) decreases to −0.02. Similarly, for negative errors, when the slope becomes greater than +0.02, summing is stopped.

Figure 7:
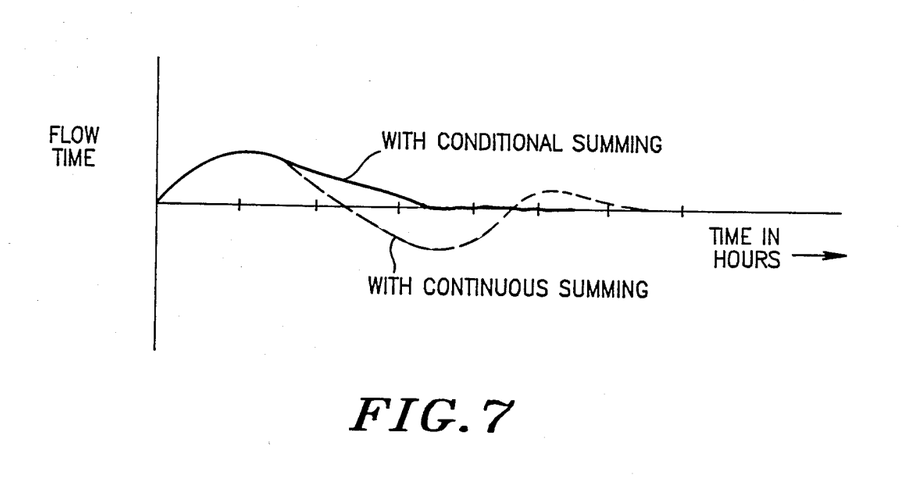
FIG. 7 shows the effects of conditional summing on the control function.

The result of this process is that the error curve reaches its peak and continues back toward zero error just slightly. At this point, the make-up add rate just slightly exceeds the evaporation rate. Summing remains inhibited unless the slope condition changes again to re-enable it. FIG. 7 shows the comparison with and without conditional summing. The net result is that over a wide range of evaporation rates and gain parameter variations, the recovery back to zero error is well controlled with little or no overshoot.

In one embodiment, the finalized control equation was:

$$T = .5 \times E + 1 \times \frac{dE}{dt} + .016 \times \sum_{\text{Conditional}} ER$$

Where required, it is possible to further modify the control system block to include summing the derivative of the error signal multiplied by an appropriate coefficient as well as the error signal itself. For example, substituting the following term into the control function:

$$\sum_{\text{Conditional}} \left( E + 8 \times \frac{dE}{dt} \right)$$

The idea is to more rapidly grow the sum if the error is rapidly increasing and less rapidly if not. The net effect of this feature is to rapidly limit the error peak and return the error to zero without overshoot for a wider range of gain. In high noise systems however this alteration to the basic system disclosed in FIG. 5 is not desirable. High noise systems can reintroduce overshoot and oscillation. As a rule of thumb, if the noise levels are assumed to be less than ¼ second peak-to-peak, this additional modification will work well. Where spurious noise reaches one to two seconds peak-to-peak, conditional summing of the derivative term should not be utilized.

In sum, the present invention is a means of controlling flow rate in a recirculating ink system. Control of flow rate translates directly into control of ink drop velocity, a necessary requirement for quality ink jet printing. From the foregoing, the manner of implementing this system in either solid state logic or by computer will be apparent. For completeness, however, software flow diagrams are provided by which the invention may be implemented by computer.

The software shown in FIGS. 8a to 8d is generally self-explanatory to those skilled in the art. However, a brief review is provided to insure accuracy and completeness of the disclosure.

Figure 8A:
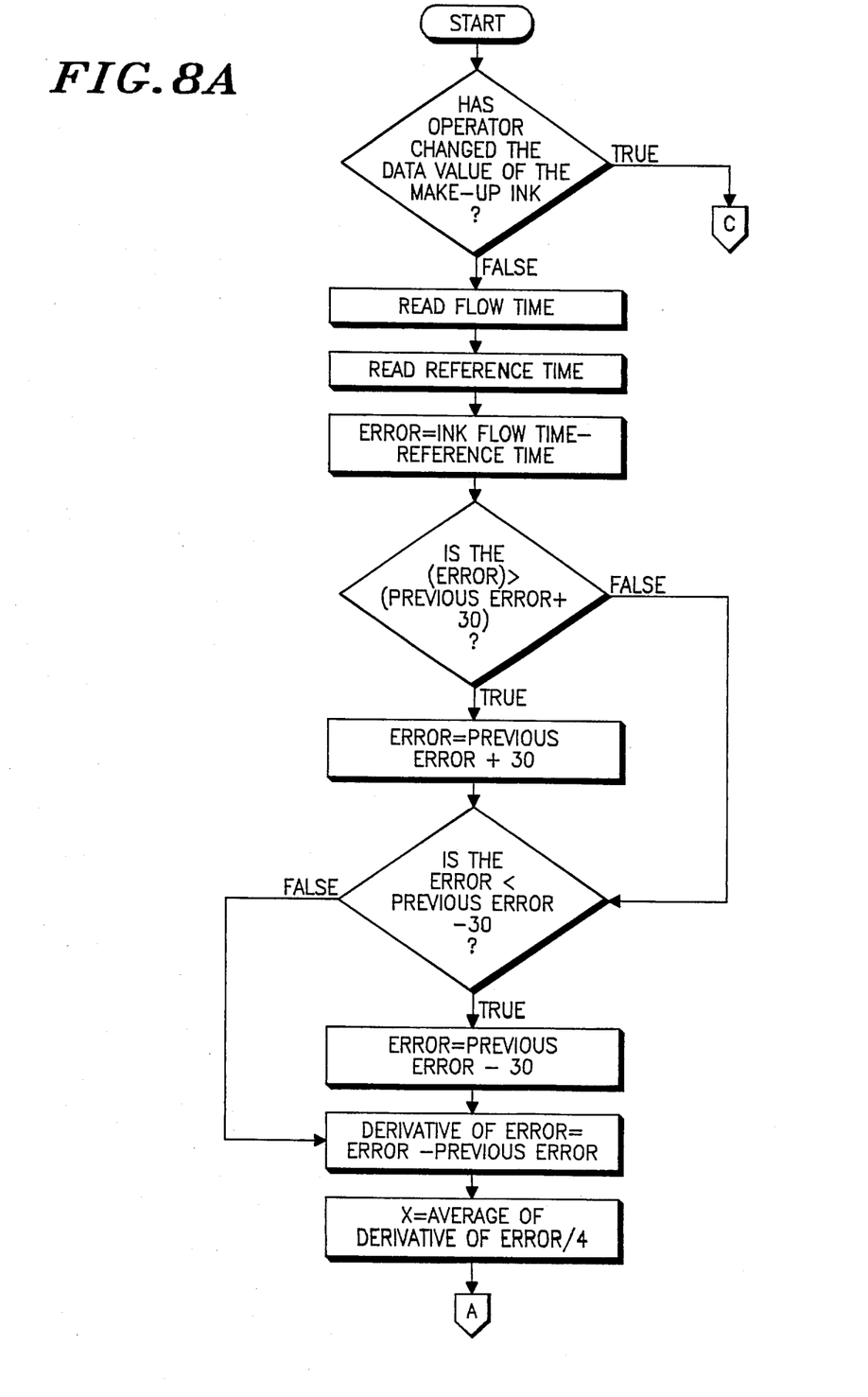
FIGS. 8a through 8d are software flow diagrams useful for implementing the control function of the present invention.

Referring to FIG. 8a, the software initially checks to see if the operator has manually changed the data used for operating the make-up ink valve. If so, the program branches to FIG. 8d. If not, the program reads flow time and reference time and computes the error (the difference between flow time and reference time). As shown in FIG. 5, the error is then passed through a clipper which limits the error to its previous value plus or minus 0.3 seconds. The derivative of the error is then taken.

Figure 8B:
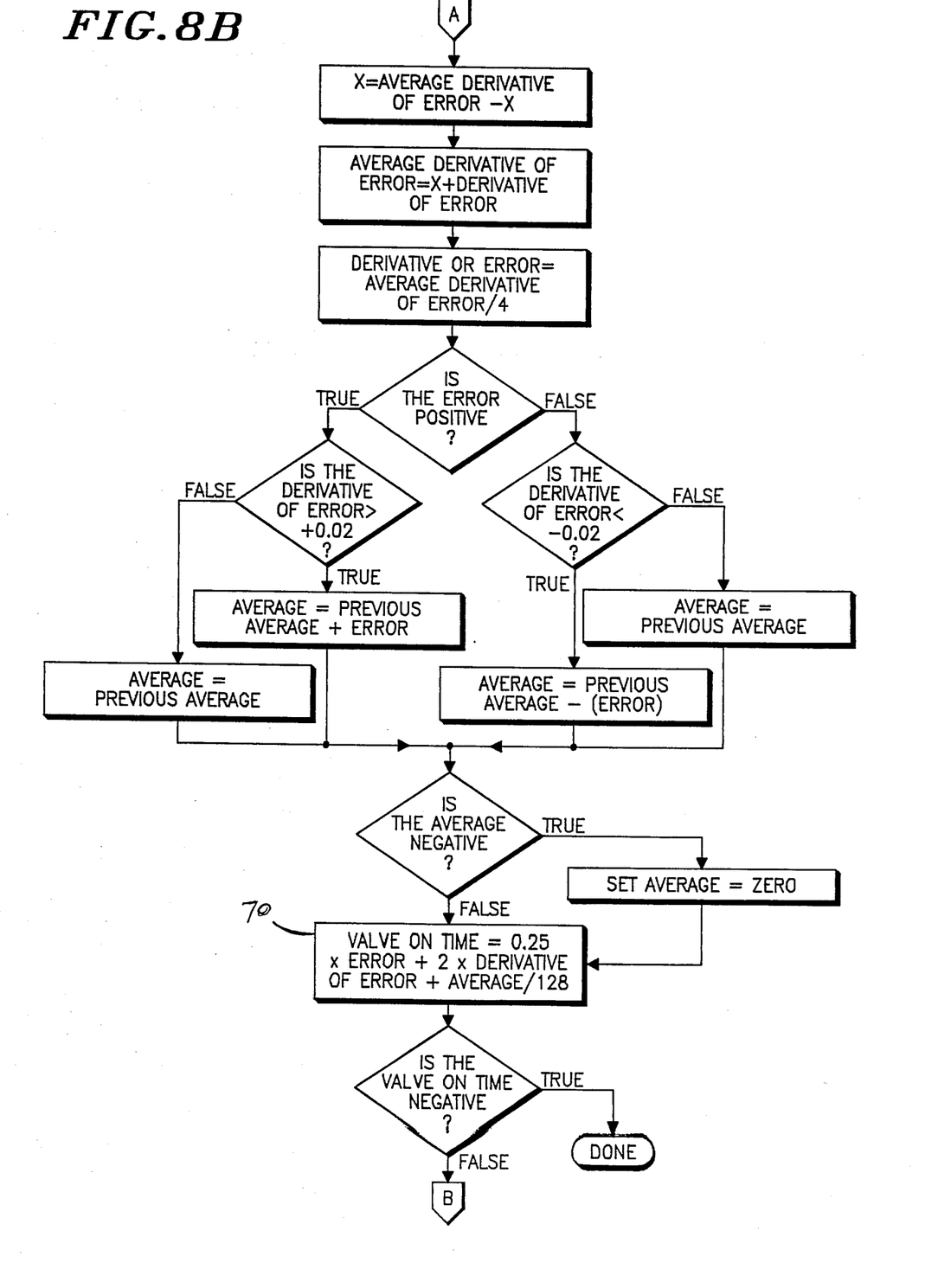

Referring to FIG. 8b, the function of the two cycle filter 50 is next implemented as shown in the final box on FIG. 8a and the first three boxes on FIG. 8b. After determining whether the error is positive or negative, the conditional summing function shown at box 52 in FIG. 5 is implemented. The conditional aspect of the summing is achieved by requiring that the derivative of the error be greater than −0.02 or less than +0.02. If this condition is not met, the summation used is the previous value rather than a newly computed value.

Figure 8C:
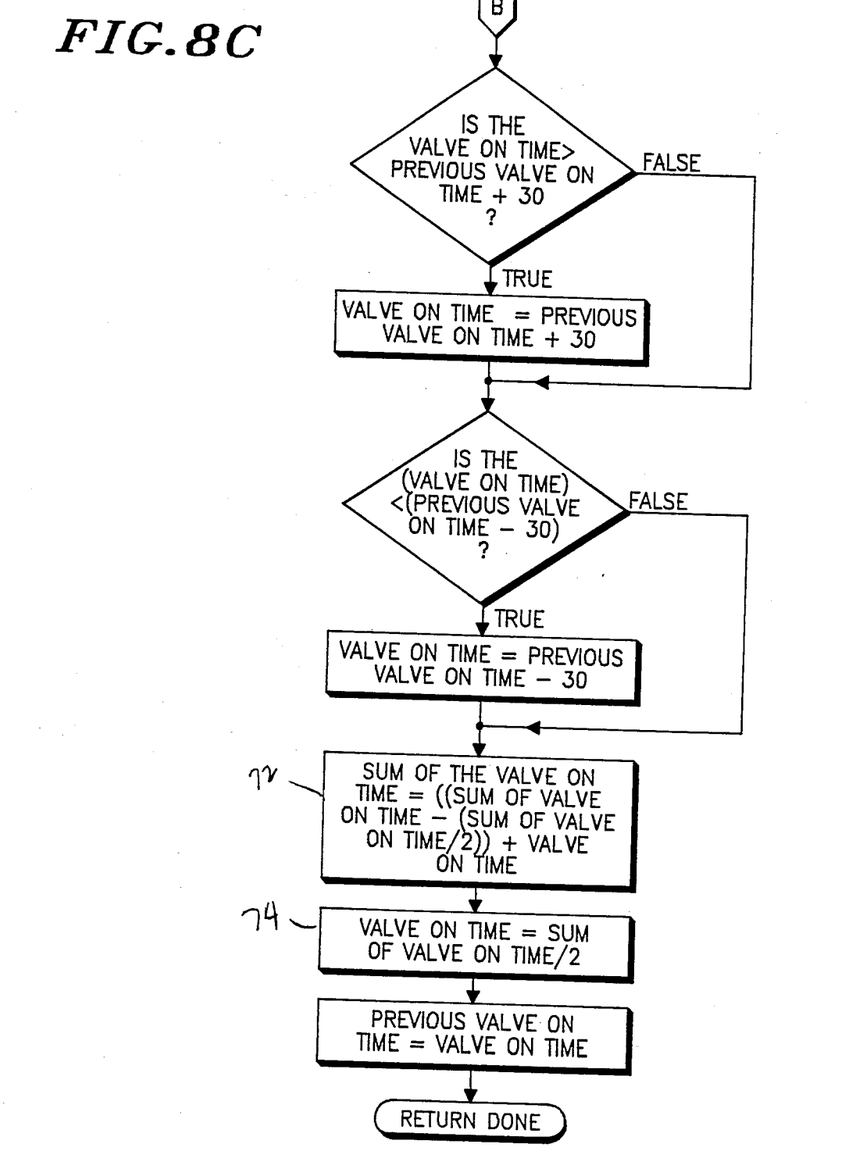

Referring to FIG. 8c, the first four functions correspond to clipper 54 in FIG. 5. Boxes marked 72 and 74 in FIG. 8c correspond to the two-cycle filter 56 in FIG. 5. Finally, the valve on-time is stored for the next iteration of the software operation.

Figure 8D:
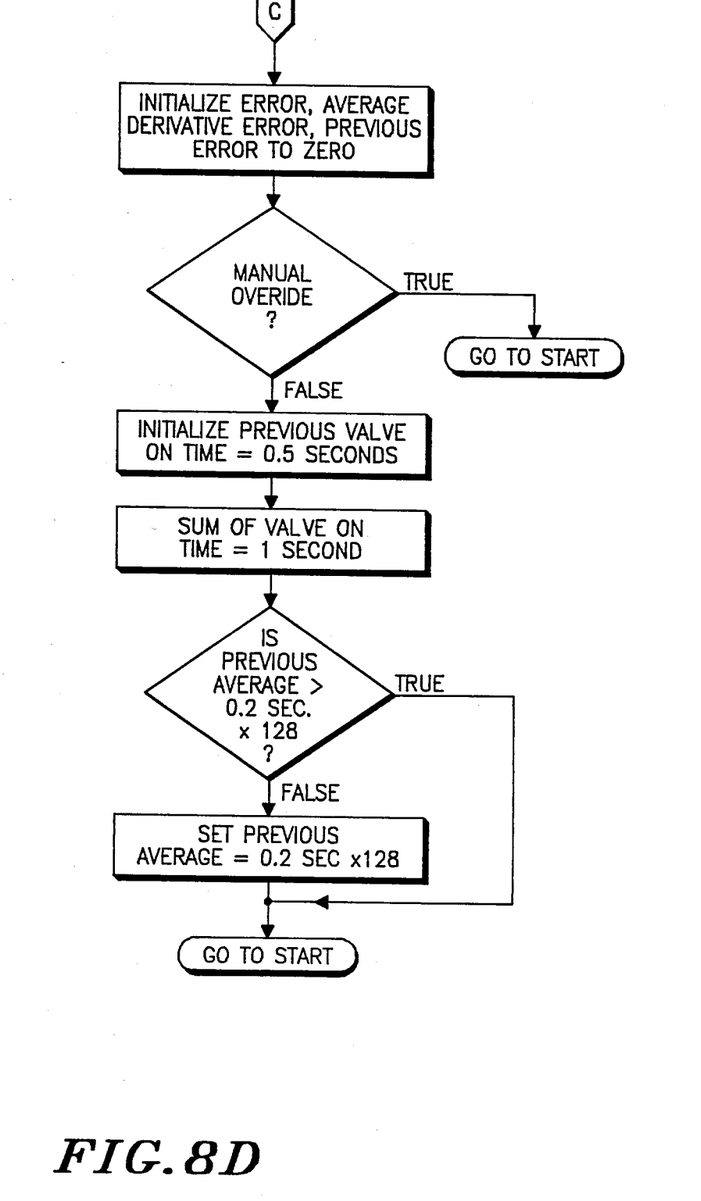

Referring to FIG. 8d, in the event that the operator has changed the value for the make-up ink operation, the error values used for the calculation are set to zero. The previous valve on-time is set equal to the new operator entered value. The sum of valve on-time is set to twice the new value. The previous summation is set to 64 times the new value. This is so that when the valve on-time is next calculated, the result will be the new requested value. Operation then commences as shown in FIG. 8a and the PID control functions correct any error in the initial value thus selected.

While the present invention has been illustrated and described in terms of preferred embodiments, other variations and modifications of the embodiments shown and described will be apparent to those skilled in the art all within the intended spirit and scope of the invention.

What is claimed is:

1. A flow rate controller for an ink jet system having an ink valve by which make-up ink may be added to the system substantially to maintain flow rate at a set point value comprising:
    (a) means for periodically comparing the set point value with the actual flow rate to generate an error signal;
    (b) means for operating on said error signal to produce proportional (P), derivative (D) and integral (I) values derived therefrom; and
    (c) means for combining the P, I and D values to produce a valve on-time signal for controlling said ink valve;
    whereby as ink evaporates from the ink jet system said ink valve is operated to cause make-up ink to be added to said system.

2. The apparatus of claim 1, wherein the means for combining the P, I and D values employs the relationship to $$T = K1(E) + K2\left(\frac{dE}{dt}\right) + K3 \quad Edt$$

produce the valve on-time signal where
    T=valve on-time
    E=flow time−set point and
    $K_1$, $K_2$, $K_3$ are empirically determined constants.

3. The apparatus of claim 1, further including clipper means for limiting the magnitude of the error and valve on-time signals to reduce the effects of electrical noise inherent in ink jet systems.

4. The apparatus of claim 3, wherein said clipper means include feedback means for periodically adjusting the limits of said clipper means to follow the error and valve on-time signals.

5. The apparatus of claim 1, further including first and second noise filter means, said first filter means filtering the derivative value (D) from said operating means, said second filter means filtering the output from said combining means.

6. The apparatus of claim 5, wherein said filter means are two cycle filters.

7. The apparatus of claim 1, wherein said operating means includes means for inhibiting change of the integral value I when the magnitude of the slope of the error signal (dE/dt) is small whereby set point undershoot and overshoot is substantially reduced.

8. The apparatus of claim 7, wherein the inhibiting means inhibits change of the value I term whenever:
    (a) the error signal is positive and (dE/dt) is less than −0.02; and
    (b) the error signal is negative and (dE/dt) is greater than +0.02.

9. The apparatus of claim 7, wherein said means for operating produces an integral value by summing the error signal and its derivative.

10. In an ink jet system including an ink reservoir, a printing head supplied by said reservoir, means for measuring ink flow rate, a supply of make-up ink and a controllable valve by which make-up ink is added to said reservoir to maintain flow rate at a set point value, the improvement comprising:
    (a) means for periodically comparing the set point value with the actual flow rate to generate an error signal;
    (b) means for operating on said error signal to produce proportional (P), derivative (D) and integral (I) values derived therefrom; and
    (c) means for combining the P, I and D values to produce a valve on-time signal for controlling said ink valve;
    whereby as ink evaporates from the ink jet system said valve is operated to cause make-up ink to be added to said system.

* * * * *

UNITED STATES PATENT AND TRADEMARK OFFICE
CERTIFICATE OF CORRECTION

PATENT NO. : 4,827,280

DATED : May 2, 1989

INVENTOR(S) : Michael E. Stamer

It is certified that error appears in the above-identified patent and that said Letters Patent is hereby corrected as shown below:

Column 2, Line 52 add $--\int--$ before $E_{dt}$

Column 4, Line 25 add $--\int--$ before $E_{dt}$

Column 8, Line 15 add $--\int--$ before $E_{dt}$

Signed and Sealed this

Ninth Day of January, 1990

*Attest:*

JEFFREY M. SAMUELS

*Attesting Officer*     *Acting Commissioner of Patents and Trademarks*